United States Patent
Cai et al.

(10) Patent No.: US 7,725,104 B2
(45) Date of Patent: May 25, 2010

(54) LOCAL CALLING AREA DETERMINATION IN WIRELESS NETWORKS

(75) Inventors: Yigang Cai, Naperville, IL (US); Jie Su, Beijing (CN)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 950 days.

(21) Appl. No.: 11/425,196

(22) Filed: Jun. 20, 2006

(65) Prior Publication Data

US 2008/0039064 A1    Feb. 14, 2008

(51) Int. Cl.
*H04Q 7/20* (2006.01)

(52) U.S. Cl. .................... 455/422.1; 455/440

(58) Field of Classification Search .......... None
See application file for complete search history.

(56) References Cited

U.S. PATENT DOCUMENTS 5,802,468 A * 9/1998 Gallant et al. ............ 455/422.1

2002/0087502 A1    7/2002 Nagy et al.
2004/0162855 A1 *  8/2004 Nagy et al. ............... 707/104.1

* cited by examiner

*Primary Examiner*—Lester Kincaid
*Assistant Examiner*—Phuoc Doan
(74) *Attorney, Agent, or Firm*—Duft, Bornsen & Fishman, LLP

(57) ABSTRACT

Systems and methods are disclosed that determine whether incoming calls are in a home local calling area (LCA) in a wireless network. One embodiment comprises an LCA determination system that includes a processing system and a mapping data structure. The mapping data structure includes a plurality of entries that map a switch/cell identifier (e.g., an MSC/cellsiteID) to a set of LCA identifiers. For a call in a wireless network, the processing system receives a switch/cell identifier, masks the sector identifier from the switch/cell identifier, and searches the mapping data structure based on the masked switch/cell identifier to identify an associated set of LCA identifiers. The processing system then compares the set of LCA identifiers to a subscriber profile to determine if an LCA identifier matches. If there is a match, then the processing system determines that the call is in a home LCA.

20 Claims, 5 Drawing Sheets

| LCA ID | MSC/CELL SITE ID | CALL ZONE |
|---|---|---|
| 1 | 011111101777 | <LOCAL ZONE> |
| 1 | 011111102777 | <LOCAL ZONE> |
| 1 | 011111103777 | <LOCAL ZONE> |
| 1 | 011111101888 | <LOCAL ZONE> |
| 1 | 011111102888 | <LOCAL ZONE> |
| 1 | 011111103888 | <LOCAL ZONE> |
| 2 | 011111101888 | <LOCAL ZONE> |
| 2 | 011111102888 | <LOCAL ZONE> |
| 2 | 011111103888 | <LOCAL ZONE> |
| 1 | 011111101999 | <LOCAL ZONE> |
| 1 | 011111102999 | <LOCAL ZONE> |
| 1 | 011111103999 | <LOCAL ZONE> |
| 2 | 011111101999 | <LOCAL ZONE> |
| 2 | 011111102999 | <LOCAL ZONE> |
| 2 | 011111103999 | <LOCAL ZONE> |
| 3 | 011111101999 | <LOCAL ZONE> |
| 3 | 011111102999 | <LOCAL ZONE> |
| 3 | 011111103999 | <LOCAL ZONE> |

| LCA ID | SWITCH/CELL ID |
|---|---|
| 1 | 011111100777 |
| 1, 2 | 011111100888 |
| 1, 2, 3 | 011111100999 |

LOCAL CALLING AREA DETERMINATION IN WIRELESS NETWORKS

BACKGROUND OF THE INVENTION

1. Field of the Invention

The invention is related to the field of wireless networks and, in particular, to determining if subscribers on a call are in a local calling area (LCA) to provide a local or long distance rating for the call.

2. Statement of the Problem

Service providers rate prepaid and postpaid calls in wireless networks based on the locations of a called subscriber. The ratings are typically based on Local Calling Areas (LCA) defined by the service providers. The service providers map out particular geographic areas into calling areas, and define which of the calling areas are home Local Calling Areas (LCA) for particular subscribers. If a called subscriber is in their home LCA, then the incoming call comprises a local call and is billed accordingly. If the called subscriber is not in their home LCA, then the incoming call comprises a roaming call and is billed accordingly.

One problem for service providers is efficiently determining whether the call is a local call in the wireless network (i.e., the called subscriber is in their home LCA). When a subscriber registers with the wireless network, the subscriber is served by a cell site and a Mobile Switching Center (MSC) in a particular LCA. If a call is placed to the subscriber, the signaling for the call typically includes identifiers for the MSC, the cell site, and the sector that are serving the subscriber. For example, in a CDMA network using ISUP signaling, IS-826 triggers include a plurality of parameters, such as an MSCID and an SCELLID. The MSCID is an identifier for the MSC serving the subscriber. The SCELLID (Serving Cell ID) is an identifier for the cell site and the sector serving the subscriber.

The combination of the MSCID and SCELLID, referred to herein as the MSC/cellsiteID, may be used to identify in which LCA a subscriber is located. Service providers generate mapping tables having entries that map an LCA ID to an MSC/cellsiteID. The MSC/cellsiteID is mapped to the LCA ID in that the MSC, the cell site, and the sector identified by the MSC/cellsiteID serve the particular LCA identified by the LCA ID. The mapping tables may then be used to determine if a subscriber is located in a particular LCA based on the MSC/cellsiteID of the MSC, the cell site, and the sector presently serving the subscriber. The LCA corresponding with the present location of the subscriber may be compared against a subscriber profile to determine if the subscriber is in their home LCA.

LCAs frequently overlap meaning that a cell site is located in more than one LCA. FIG. 1 illustrates overlapping LCAs in the prior art. FIG. 1 shows three LCAs: LCA1, LCA2, and LCA3. FIG. 1 also shows three cell sites. Cell site A is located in LCA1. Cell site B is located in LCA1 and LCA2. Cell site C is located in LCA1, LCA2, and LCA3. Cell sites A-C are connected to an MSC that is not shown in FIG. 1.

Assume for discussion that an MSCID for the MSC (not shown) connected to cell sites A-C is "0111111". Further assume that the SCELLID for Cell site A is "777", the SCELLID for Cell site B is "888", and the SCELLID for Cell site C is "999". Each cell site includes three sectors that have an identifier of "01", "02", and "03", respectively. Thus, an exemplary MSC/cellsiteID for Cell site A may be "011111101777". The actual format of the MSC/cellsiteID may depend on the type of the MSC. For instance, different MSC vendors may format the MSC/cellsiteID differently.

FIG. 2 illustrates a mapping table in the prior art. As previously stated, entries in the mapping table include an LCA ID mapped to an MSC/cellsiteID. For instance, the first entry in the mapping table includes a LCA ID of "1" mapped to an MSC/cellsiteID of "011111101777". The first entry means that MSC "0111111", sector "01", and cell site "777" are located in LCA1. Similarly, the second entry in the mapping table includes a LCA ID of "1" mapped to an MSC/cellsiteID of "011111102777". The second entry means that MSC "0111111", sector "02", and cell site "777" are located in LCA1.

If a cell site is in multiple LCAs, then there is an individual entry in the mapping table for the MSC/cellsiteID of the cell site and the associated LCA wherein the cell site is located. For instance, for the MSC/cellsiteID "011111101999", there is an individual entry for LCA1, LCA2, and LCA3 (see FIG. 2). Also, because each cell site has three sectors, the mapping table in FIG. 2 includes an individual entry for each sector.

In a typical wireless network, if a call is placed from a calling subscriber to a called subscriber, an MSC in the wireless network receives the call. To provide charging for the incoming call, a Service Control Point (SCP) or a billing system determines whether the call is a local call or a long distance call. For tills determination, the MSC receives the MSC/cellsiteID for the network resources serving the called subscriber and transmits a report to the SCP that includes the MSC/cellsiteID. The SCP then searches the mapping table with the MSC/cellsiteID for the called subscriber to identify an LCA for the called subscriber. The SCP searches for each instance of the MSC/cellsiteID in the mapping table. The mapping table will include at least three instances of the MSC/cellsiteID representing the different sectors of a cell site. If a cell site is in multiple LCAs, then the mapping table will also include multiple instances MSC/cellsiteID for each of the LCAs. After the SCP locates each LCA for the called subscriber, the SCP compares the LCAs to a subscriber profile for the called subscriber. If one or more of the LCAs match the LCA(s) indicated in the subscriber profile, then the called subscriber is in the home LCA and the call is a local call. Otherwise, the call is a roaming call or long distance call.

Unfortunately, identifying local calls according to the present methods is inefficient. Presently, the SCP has to search the mapping table numerous times to determine the LCA(s) of the called subscriber. This can especially be a problem if the number of entries in the mapping table grows very large due to the overlapping of cell sites in multiple LCAs, due to entries for each sector of a cell, etc. The large size of the mapping table also makes maintenance of the mapping table more complicated. Adding a new cell site to the wireless network also requires that multiple entries be added to the mapping table, which is time consuming. Further, wireless networks may install MSCs from different vendors that define different formats for the MSC/cellsiteID. This further complicates how the entries in the mapping table are populated and how the mapping table is searched. A problem thus remains how to efficiently determine whether calls in a wireless network are in a home LCA.

SUMMARY OF THE SOLUTION

The invention solves the above and other problems by efficiently determining whether a call is a local call (i.e., in the home LCA) through an improved mapping data structure and an improved searching method.

One embodiment of the invention comprises an LCA determination system used in a wireless network to determine whether an incoming call placed in the wireless network is in a home LCA. The LCA determination system comprises a processing system and a mapping data structure. The mapping data structure includes a plurality of entries that map a switch/cell identifier (e.g., an MSC/cellsiteID) associated with a switching system and a cell site in the wireless network to a set of LCA identifiers. In one embodiment, the sector identifier typically included in the switch/cell identifier may be masked in the entries of the mapping data structure. Present mapping tables include an entry for each switch/cell identifier that includes a different sector identifier. By masking the sector identifier in the mapping data structure, the number of entries can be reduced. Reducing the number of entries in the mapping data structure allows the mapping data structure to be maintained more easily, allows for faster searches in the mapping data structure, and allows new cell sites to be added to mapping data structure more easily.

The processing system is adapted to receive a switch/cell identifier for a switching system and the cell site that is serving a subscriber on a call in the wireless network. The processing system is adapted to identify a type of the switching system serving the subscriber, and identify a sector identifier in the switch/cell identifier based on the type of the switch system. The processing system is adapted to mask the sector identifier in the switch/cell identifier to determine a masked switch/cell identifier. The processing system is adapted to search the mapping data structure based on the masked switch/cell identifier to identify a set of LCA identifiers mapped to the masked switch/cell identifier. The processing system is adapted to identify a subscriber profile for the subscriber. The subscriber profile includes one or more LCA identifiers indicating the LCA(s) for the subscriber. The processing system is adapted to compare the set of LCA identifiers found in the mapping data structure to the subscriber profile to determine if one or more of the LCA identifiers are included in the subscriber profile. If one or more of the LCA identifiers are included in the subscriber profile, then the processing system is adapted to determine that the call is in a home LCA and is a local call. If one or more of the LCA identifiers are not included in the subscriber profile, then the processing system is adapted to determine that the call is not in a home LCA and is not a local call but is a long distance call. The processing system may then report the results to a rating engine in the wireless network.

The LCA determination system more efficiently identifies LCA calls through the operation described above. The processing system in the LCA determination system only needs to access and search the mapping data structure once to find the set of LCA identifiers associated with the masked switch/cell identifier. The processing system can then compare the set of LCA identifiers to the subscriber profile to identify whether the call is in a home LCA of the subscriber. The processing system advantageously avoids searching the mapping data structure multiple times.

Because entries in the mapping data structure include a set of LCA identifiers associated with a switch/cell identifier, the number of entries in the mapping data structure can advantageously be reduced over present mapping tables. Present mapping tables include an individual entry for each LCA identifier associated with a switch/cell identifier. By grouping the LCA identifiers in a set associated with the switch/cell identifier, the number of entries can advantageously be reduced.

In another embodiment of the invention, the processing system in the LCA determination system is adapted to receive a switch/cell identifier for a switching system and the cell site that is serving a first subscriber on a call in the wireless network. The processing system is adapted to search the mapping data structure based on the received switch/cell identifier to identify a set of LCA identifiers mapped to the received switch/cell identifier. The processing system is adapted to identify a subscriber profile for a second subscriber on the call. The subscriber profile includes one or more LCA identifiers indicating the LCA(s) for the second subscriber. The processing system is adapted to compare the set of LCA identifiers found in the mapping data structure to the subscriber profile to determine if one or more of the LCA identifiers are included in the subscriber profile. If one or more of the LCA identifiers are included in the subscriber profile, then the processing system is adapted to determine that the call is in a home LCA and is a local call. If one or more of the LCA identifiers are not included in the subscriber profile, then the processing system is adapted to determine that the call is not in a home LCA and is not a local call but is a long distance call. The processing system may then report the results to a rating engine in the wireless network.

The invention may include other exemplary embodiments described below.

DESCRIPTION OF THE DRAWINGS

The same reference number represents the same element or same type of element on all drawings.

DETAILED DESCRIPTION OF THE INVENTION

FIGS. 3-7 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figures 3, 4:
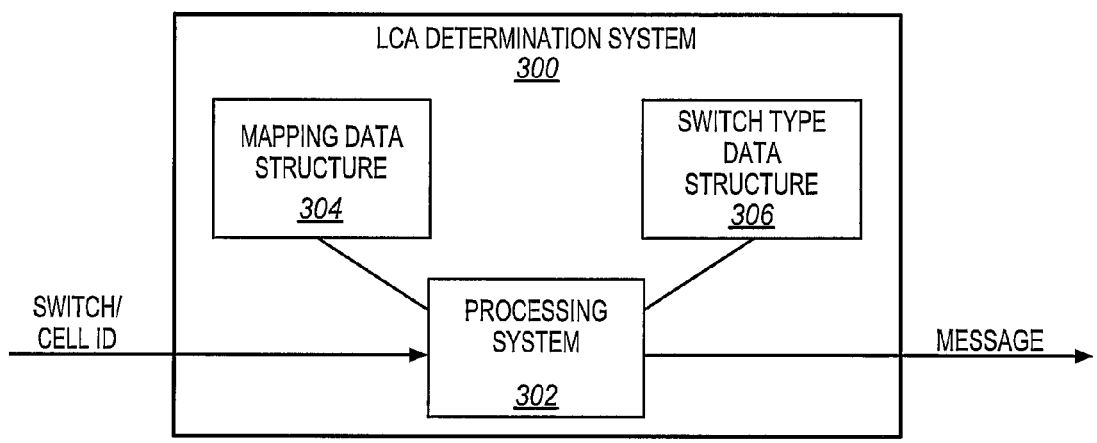
FIG. 3 illustrates an LCA determination system in an exemplary embodiment of the invention.
FIG. 4 illustrates an example of a mapping data structure in an exemplary embodiment of the invention.

FIG. 3 illustrates an LCA determination system 300 in an exemplary embodiment of the invention. LCA determination system 300 is implemented in a wireless network (not shown), such as a CDMA network, a TDMA network, a GSM network, a UMTS network, an IMS network, etc. LCA determination system 300 may be implemented in an existing network node of the wireless network, such as an MSC, an SCP, a billing system, etc, or may be a stand-alone system or server. LCA determination system 300 includes a processing system 302 and a mapping data structure 304. Processing system 302 may comprise a single processor or a plurality of processors. Mapping data structure 304 may comprise a database, a table, or any other type of indexed structure that is searchable. LCA determination system 300 may include other components, systems, or devices not shown in FIG. 3.

Mapping data structure 304 includes a plurality of entries. In one embodiment of the invention, mapping data structure 304 includes a single entry for a switch/cell ID that is mapped to a set of LCA ID's (one or more LCA IDs). The LCA ID's identify LCAs defined by the service provider operating the wireless network. The switch/cell ID is mapped to the set of LCA ID's. The switch/cell ID comprises an identifying number, code, etc, for a switching system (e.g., an MSC) and cell site (e.g., base station) serving a subscriber in the wireless network. If a cell site is in multiple LCAs, then present mapping tables include an individual entry for the MSC/cellsiteID of the cell site and the associated LCA where the cell site is located. If a cell site is located in five LCAs, then present mapping tables will include a single instance of the MSC/cellsiteID for each of the five LCAs. In this embodiment, the switch/cell ID may be mapped to the set of LCA ID's in the single entry so that multiple instances of the same switch/cell ID are not needed. The number of entries in the mapping data structure 304 may advantageously be reduced.

Additionally, present mapping tables include an MSC/cellsiteID comprised of an MSC ID, a cell site ID, and a sector ID. In one embodiment of the invention, the switch/cell ID in the entries of mapping data structure 304 includes a switching system ID and a cell site ID but does not include the sector ID. Sectors of a cell site are typically within the same LCA, so the sector ID typically is not needed to identify an LCA. Removing the sector ID from the switch/cell ID may advantageously be a three-fold reduction in the number of entries in the mapping data structure 304.

FIG. 4 illustrates an example of mapping data structure 304 in an exemplary embodiment of the invention. The mapping data structure 304 illustrated in FIG. 4 is just one example, and mapping data structure 304 may take on other forms in other embodiments. Entries in mapping data structure 304 include a set of LCA ID's mapped to a switch/cell ID. For instance, the second entry in mapping data structure 304 includes LCA ID's of "1" and "2" and a switch/cell ID of "011111100888". The second entry means that switching system "0111111" and cell site "888" are located in LCA1 and LCA2 (see also FIG. 1). The second entry also shows that the sector ID has been masked by setting the sector ID to 0's.

Figures 1, 2:
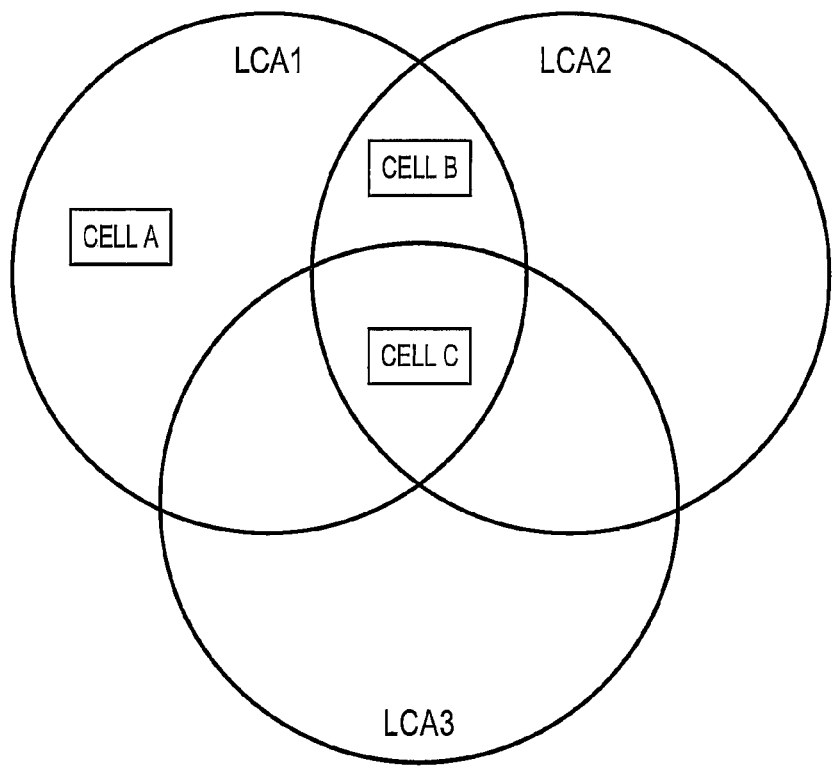
FIG. 1 illustrates overlapping LCAs in the prior art.
FIG. 2 illustrates a mapping table in the prior art.

The data in mapping data structure 304 corresponds with the data in the mapping table of FIG. 2. As is evident by comparing FIG. 4 and FIG. 2, the number of entries can advantageously be reduced by including a set of LCA ID's in a single entry and by excluding the sector ID from the switch/cell ID. Mapping data structure 304 can be maintained more easily, searches in mapping data structure 304 can be performed faster, and new cell sites can be added to mapping data structure 304 more easily.

Figure 5:
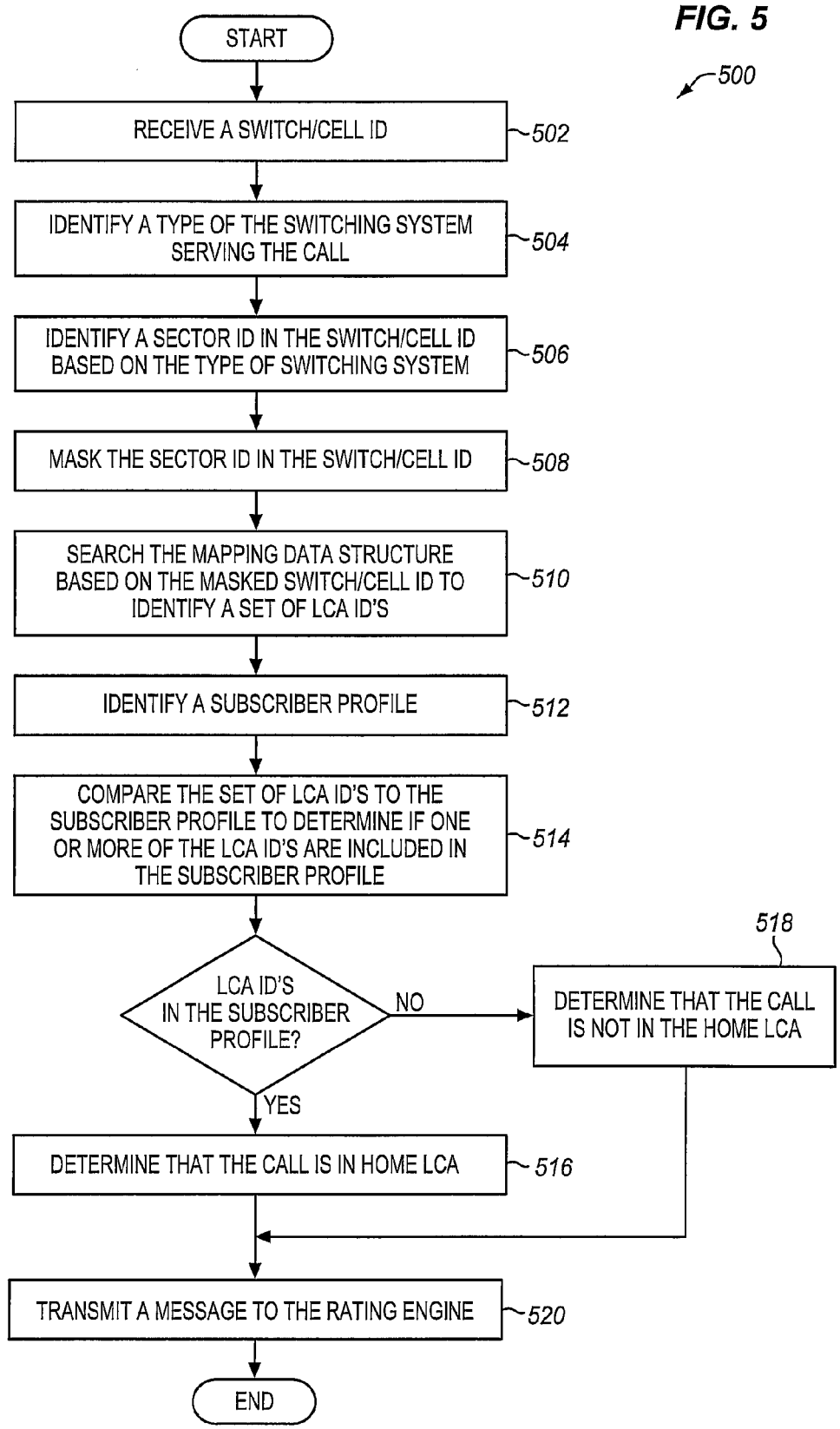
FIG. 5 is a flow chart illustrating a method of determining if calls in a wireless network are in a home LCA in an exemplary embodiment of the invention.

FIG. 5 is a flow chart illustrating a method 500 of determining if calls in a wireless network are in a home LCA in an exemplary embodiment of the invention. The steps of method 500 will be described with reference to LCA determination system 300 in FIG. 3. The steps of the flow chart in FIG. 5 are not all inclusive and may include other steps not shown.

In step 502, processing system 302 in LCA determination system 300 receives a switch/cell ID for a call in the wireless network. The switch/cell ID is associated with the switching system and the cell site that is serving a subscriber (called or calling) on the call. Processing system 302 may receive the switch/cell ID from different nodes in the wireless network. For instance, if the call is prepaid, then processing system 302 may receive the switch/cell ID from an MSC or an SCP serving the call. If the call is postpaid, then processing system 302 may receive the switch/cell ID from a billing system that has received a call detail record (CDR) for the call.

In step 504, processing system 302 identifies a type of switching system that is serving the subscriber for the call. A type of switching system comprises any characteristic that determines how a switching system formats a switch/cell ID. Identifying the type of the switching system may comprise identifying what type of node the switching system is, such as an MSC, an SCP, or another node. Identifying the type of the switching system may comprise identifying a vendor that manufactured the switching system. Different types of switching systems may format the switch/cell ID differently. For instance, one vendor may format the switch/cell ID with the sector ID as the first two bits. Another vendor may format the switch/cell ID with the sector ID as bit 7 and bit 8.

Processing system 302 may identify the type of switching system based on a point code for the switching system. A point code is a unique identifier that identifies a network node in order to properly route calls to the network node. Processing system 302 may receive the point code for the switching system along with the switch/cell ID. As illustrated in FIG. 3, LCA determination system 300 may further include a switch type data structure 306. Processing system 302 may then search for the type of switching system in switch type data structure 306 based on the point code. The switch type data structure includes a plurality of entries that map a point code for a switching system to a type of switching system.

When the type of switching system is determined, processing system 302 may identify the format of the switch/cell ID based on the type of switching system. The switch/cell ID typically includes a switching system ID, a cell site ID, and a sector ID in a particular format, such as switching system ID+sector ID+cell site ID. Identifying the format of the switch/cell ID may include identifying a start bit and possibly a stop bit for the sector ID in the switch/cell ID.

In step 506 of FIG. 5, processing system 302 identifies a sector ID in the switch/cell ID based on the type of the switching system (and the associated format of the switch/cell ID for this type of switching system). In step 508, processing system 302 masks the sector ID in the switch/cell ID to determine a masked switch/cell ID. In masking the sector ID, processing system 302 may remove the bits for the sector ID from the switch/cell ID, may alternatively set the bits for the sector ID to "0" or some other value, or perform some other type of masking.

In step 510, processing system 302 searches mapping data structure 304 based on the masked switch/cell ID to identify a set of LCA ID's associated with the masked switch/cell ID. In step 512, processing system 302 identifies a subscriber profile for the subscriber. Processing system 302 may be provisioned with the subscriber profile, and may be able to identify the subscriber profile in a local memory. Alternatively, processing system 302 may query a subscriber database, such as a Home Location Register (HLR) or a Home Subscriber Server (HSS), to acquire the subscriber profile.

The subscriber profile includes one or more LCA ID's indicating the home LCA(s) for the subscriber. Processing system 302 then compares the set of LCA ID's from mapping data structure 304 to the subscriber profile to determine if one or more of the LCA ID's are included in the subscriber profile in step 514. If one or more of the LCA ID's are included in the subscriber profile, then processing system 302 determines that the call is in a home LCA and is a local call in step 516. If one or more of the LCA ID's are not included in the subscriber profile, then processing system 302 determines that the call is not in a home LCA and is not a local call but is a long distance call in step 518.

Processing system 302 may then report the results to a rating engine (not shown in FIG. 3) in the wireless network. For instance, if the call is a local call, then processing system 302 may transmit a message to the rating engine indicating that the call is local in step 520. Similarly, if the call is a not a local call, then processing system 302 may transmit a message to the rating engine indicating that the call is long distance in step 520. The rating engine can then rate the call accordingly.

The home LCA determination provided in FIG. 5 focuses on whether a single subscriber is in his/her home LCA(s). Another embodiment of the invention focuses on whether a calling subscriber is located in a home LCA of a called subscriber, or vice-versa.

Figure 6:
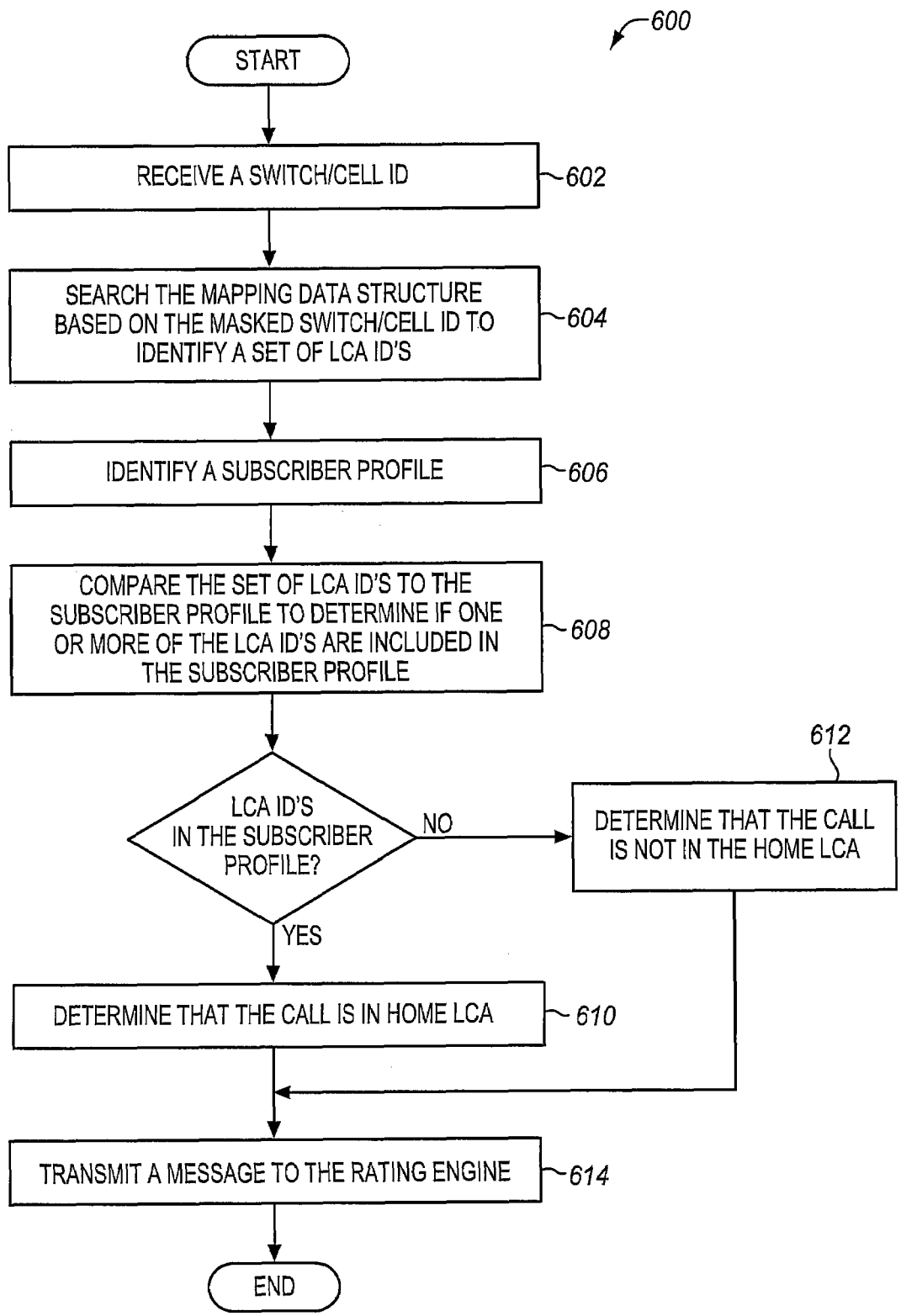
FIG. 6 is a flow chart illustrating a method of determining whether subscribers on a call in a wireless network are in a home LCA in an exemplary embodiment of the invention.

FIG. 6 is a flow chart illustrating a method 600 of determining whether subscribers on a call in a wireless network are in a home LCA in an exemplary embodiment of the invention. The steps of method 600 will be described with reference to LCA determination system 300 in FIG. 3. The steps of the flow chart in FIG. 6 are not all inclusive and may include other steps not shown.

In step 602, processing system 302 in LCA determination system 300 receives a switch/cell ID for a call in the wireless network. The switch/cell ID is associated with the switching system and the cell site that is serving a first subscriber (calling or called) on the call. Processing system 302 may receive the switch/cell ID from different nodes in the wireless network. For instance, if the call is prepaid, then processing system 302 may receive the switch/cell ID from an MSC or an SCP serving the call. If the call is postpaid, then processing system 302 may receive the switch/cell ID from a billing system that has received a call detail record (CDR) for the call.

In step 604, processing system 302 searches mapping data structure 304 based on the received switch/cell ID to identify a set of LCA ID's associated with the received switch/cell ID. Processing system 302 may mask the sector ID in the received switch/cell ID as described in FIG. 5 to search mapping data structure 304 if the entries of mapping data structure 304 are likewise masked.

In step 606, processing system 302 identifies a subscriber profile for a second subscriber on the call. Processing system 302 may be provisioned with the subscriber profile, and may be able to identify the subscriber profile in a local memory. Alternatively, processing system 302 may query a subscriber database, such as a Home Location Register (HLR) or a Home Subscriber Server (HSS), to acquire the subscriber profile.

The subscriber profile includes one or more LCA ID's indicating the home LCA(s) for the second subscriber. Processing system 302 then compares the set of LCA ID's from mapping data structure 304 to the subscriber profile to determine if one or more of the LCA ID's are included in the subscriber profile in step 608. If one or more of the LCA ID's are included in the subscriber profile, then processing system 302 determines that the call is in a home LCA and is a local call in step 610. In other words, the first subscriber is located in the home LCA of the second subscriber. If one or more of the LCA ID's are not included in the subscriber profile, then processing system 302 determines that the call is not in a home LCA and is not a local call but is a long distance call in step 612. In other words, the first subscriber is not located in the home LCA of the second subscriber.

Processing system 302 may then report the results to a rating engine (not shown in FIG. 3) in the wireless network. For instance, if the call is a local call, then processing system 302 may transmit a message to the rating engine indicating that the call is local in step 614. Similarly, if the call is a not a local call, then processing system 302 may transmit a message to the rating engine indicating that the call is long distance in step 614. The rating engine can rate the call accordingly.

In another alternative, processing system 302 may receive a switch/cell ID for both the calling subscriber and the called subscriber for a call in the wireless network. Processing system 302 may then search mapping data structure 304 based on the received switch/cell ID for the calling subscriber to identify a set of LCA ID's associated with the received switch/cell ID. Processing system 302 may also search mapping data structure 304 based on the received switch/cell ID for the called subscriber to identify a set of LCA ID's associated with the received switch/cell ID. Processing system 302 may then compare LCA ID's for the calling subscriber and the LCA ID's for the called subscriber to determine if there is a match. If there is a match, then processing system 302 is able to determine that the calling subscriber and the called subscriber are in the same LCA. The LCA ID's may also be different but may be classified as the same home zone.

Figure 7:
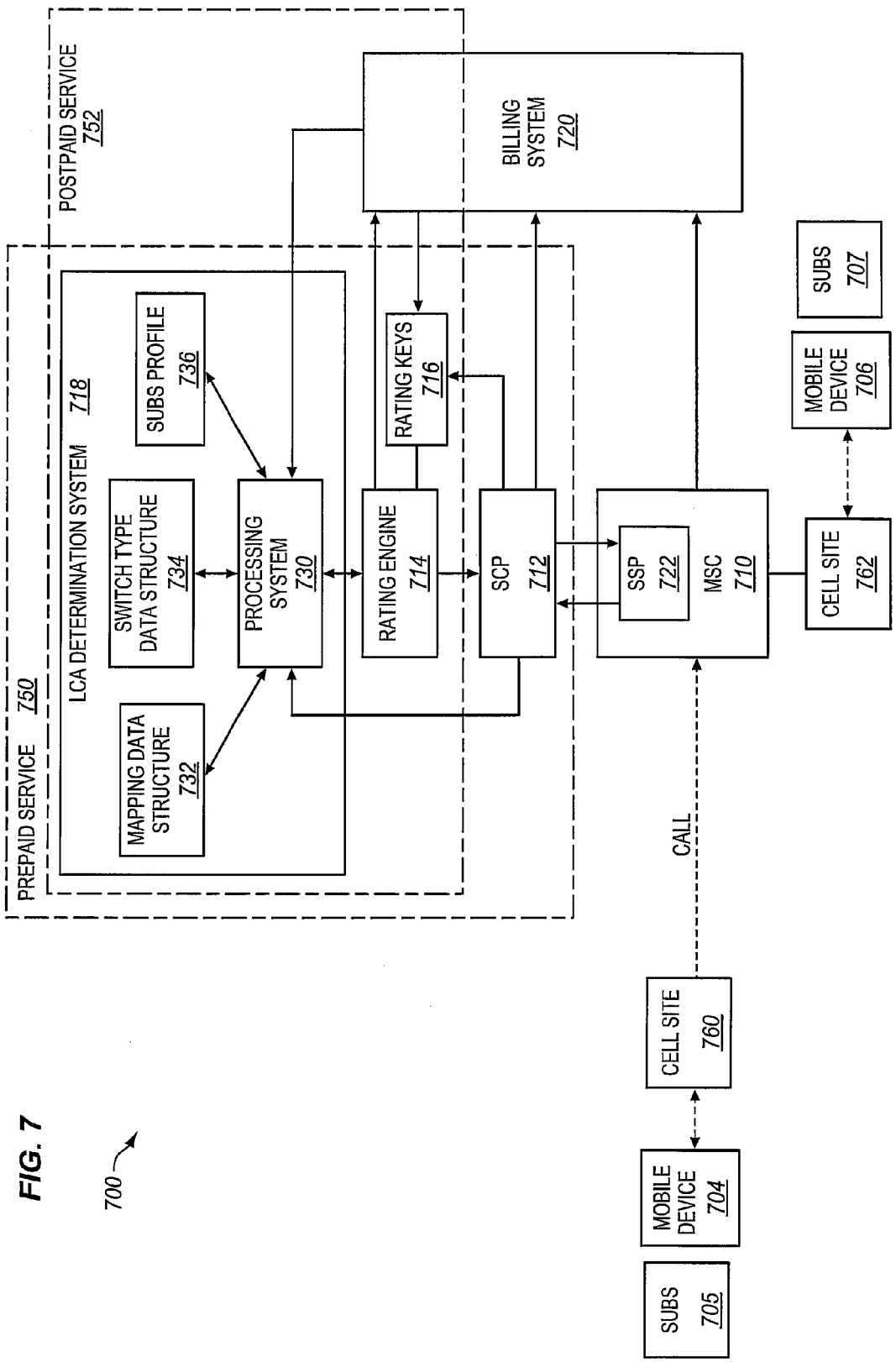
FIG. 7 illustrates a wireless network in an exemplary embodiment of the invention.

FIG. 7 illustrates a wireless network 700 in an exemplary embodiment of the invention. Wireless network 700 is adapted to provide wireless service to a mobile device 704 operated by a subscriber 705, and a mobile device 706 operated by a subscriber 707. Wireless network 700 includes a cell site 760 that is serving mobile device 704 of subscriber 705, a cell site 762 and an MSC 710 that is serving mobile device 706 of subscriber 707, an SCP 712, a rating engine 714, rating keys 716, an LCA determination system 718, and a billing system 720. MSC 710 includes a switching serving point (SSP) 722. LCA determination system 718 includes a processing system 730, a mapping data structure 732, a switch type data structure 734, and a subscriber profile 736 for subscriber 707. LCA determination system 718 is a stand-alone system in this embodiment, but may be integrated with rating engine 714, SCP 712, billing system 720, or other systems. Wireless network 700 may include other networks, systems, or devices not shown in FIG. 7.

Wireless network 700 is adapted to provide prepaid charging and postpaid charging for calls. The portion of wireless network 700 providing prepaid service is illustrated in the dotted box 750. The portion of wireless network 700 providing postpaid service is illustrated in the dotted box 752. FIG. 7 shows that a single LCA determination system 718 and a single rating engine 714 may be used for both the prepaid service and the postpaid service. This is an advantage over present wireless networks that have multiple rating engines and do not have a centralized LCA determination system 718 as described herein.

Assume for this embodiment that subscriber 705 places a call through mobile device 704 to subscriber 707. Cell site 760, which includes a base station having one or more wireless transceivers, receives the call. The call is then forwarded in wireless network 700 to MSC 710. The call is illustrated by a dotted arrow that is received by MSC 710. There may be another MSC serving mobile device 704 that routes the call to MSC 710. For a prepaid call, MSC 710 receives IS-826 triggers as part of the signaling for the call. MSC 710 transmits the IS-826 triggers to SCP 712. SCP 712 then transmits subscriber information and MSC/cell site information collected from the IS-826 triggers to LCA determination system 718. SCP 712 may also provide rating information to the rating keys 716.

For a postpaid call, MSC 710 generates a call detail record (CDR) with call information, such as the calling subscriber number, the called subscriber number, call timestamps, an MSC ID, a cell ID, etc. Billing system 720 processes the CDR, transmits billing data to rating engine 714, and transmits subscriber information and MSC/cell site information to LCA determination system 718.

LCA determination system 718 receives the subscriber information and MSC/cell site information for either a prepaid call or a postpaid call. As part of the MSC/cell site information, LCA determination system 718 receives a point code for MSC 710. Processing system 730 in LCA determination system 718 searches the switch type data structure 734 based on the point code of MSC 710 to determine a type of MSC 710. Switch type data structure 734 includes a plurality of entries. Each entry includes a point code mapped to a type of switching system. If the call is prepaid, then the type of MSC 710 may be a type of SSP 722. If the call is postpaid, then the type of MSC 710 may be a type of protocol used by MSC 710, such as CDMA or GSM.

The MSC/cell site information also includes a switch/cell ID for MSC 710 and cell site 762. One example of the switch/cell ID is an MSC/cellsiteID used in CDMA networks. When processing system 730 identifies the type of MSC 710, then processing system 730 is also able to identify a format of the switch/cell ID. More particularly, processing system 730 is able to identify where the sector ID is located in the switch/cell ID based on the format of the switch/cell ID. For instance, processing system 730 may be able to identify the starting bit and the ending bit for the sector ID.

When processing system 730 identifies the sector ID in the switch/cell ID, processing system 730 masks the sector ID in the switch/cell ID. For instance, processing system 730 may set the sector ID to O's in the switch/cell ID. Processing system 730 then searches the mapping data structure 732 based on the masked switch/cell ID. Mapping data structure 732 includes a plurality of entries. Each entry includes a masked switch/cell ID mapped to a set of LCA IDs (one or more LCA IDs). The masked switch/cell ID is a switch/cell ID with the sector ID masked. By masking the sector ID in the switch/cell ID, the number of entries in mapping data structure 732 can be reduced by a factor of three (assuming three sectors per cell).

Based on the search of mapping data structure 732, processing system 730 identifies a set of LCA IDs mapped to the masked switch/cell ID. The set of LCA IDs may indicate all of the LCAs associated with the switch/cell ID, or more particularly associated with the cell site identified by the switch/cell ID. Processing system 730 then identifies the subscriber profile 736 for the called subscriber 707. The subscriber profile 736 includes one or more LCA IDs that indicate that LCA(s) forming the home zone of the called subscriber 707. Processing system 730 then compares the set of LCAs IDs found in mapping data structure 732 to the LCAs IDs in the subscriber profile 736. If a match is found, then processing system 730 determines that the call is in a home LCA or a home zone for called subscriber 707. If not, then the call is outside of the home LCA or outside of the home zone for called subscriber 707.

Processing system 730 then transmits a message to rating engine 714 indicating whether the call is a local call, a regional call, a long distance call, etc. Rating engine 714 then rates the call based on the message from processing system 730. Rating engine 714 transmits a rating to billing system 720 to allow billing system 720 to bill for the call.

Although specific embodiments were described herein, the scope of the invention is not limited to those specific embodiments. The scope of the invention is defined by the following claims and any equivalents thereof.

We claim:

1. A local calling area (LCA) determination system in a wireless network for determining whether calls are in a home LCA, the LCA determination system comprising:
    a mapping data structure having a plurality of entries that map a switch/cell identifier associated with a switching system and a cell site in the wireless network to a set of LCA identifiers, wherein a sector identifier is masked in the switch/cell identifier in the entries of the mapping data structure; and
    a processing system adapted to receive a switch/cell identifier associated with a switching system, a cell site, and a cell sector serving a subscriber for a call in the wireless network, to identify a type of the switching system serving the subscriber, to identify a sector identifier in the switch/cell identifier based on the type of the switching system, to mask the sector identifier in the switch/cell identifier to determine a masked switch/cell identifier, to search the mapping data structure based on the masked switch/cell identifier to identify a set of LCA identifiers mapped to the masked switch/cell identifier, to identify a subscriber profile for the subscriber, to compare the identified set of LCA identifiers to the subscriber profile to determine if at least one of the identified set of LCA identifiers is included in the subscriber profile, and to determine that the call is in a home LCA responsive to determining that at least one of the set of LCA identifiers is included in the subscriber profile.

2. The LCA determination system of claim 1 wherein:
    if the call is in the home LCA, then the processing system is further adapted to transmit a message to a rating engine for the wireless network indicating that the call is a local call; and
    if the call is not in the home LCA, then the processing system is further adapted to transmit a message to the rating engine for the wireless network indicating that the call is a long distance call.

3. The LCA determination system of claim 1 further comprising a switch type data structure having a plurality of entries that map a point code for a switching system to a type of the switching system.

4. The LCA determination system of claim 3 wherein the processing system is further adapted to:
    receive a point code for the switching system serving the subscriber for the call; search the switch type data structure based on the point code to identify the type of switching system;
    identify a format of the switch/cell identifier based on the type of the switching system; and
    identify the sector identifier in the switch/cell identifier based on the format of the switch/cell identifier.

5. The LCA determination system of claim 4 wherein the format of the switch/cell identifier indicates at least one of a start bit or a stop bit for the sector identifier included in the switch/cell identifier.

6. The LCA determination system of claim 1 wherein the set of LCA identifiers mapped to the switch/cell identifier in the entries of the mapping data structure includes an LCA identifier for each of the LCAs associated with the switch/cell identifier.

7. A method of determining whether incoming calls are in a home local calling area (LCA) in a wireless network, the method comprising:
    receiving a switch/cell identifier associated with a switching system, a cell site, and a cell sector serving a subscriber for a call in the wireless network;

identifying a type of the switching system sewing the subscriber;
identifying a sector identifier in the switch/cell identifier based on the type of the switching system;
masking the sector identifier in the switch/cell identifier to determine a masked switch/cell identifier;
searching a mapping data structure based on the masked switch/cell identifier to identify a set of LCA identifiers mapped to the masked switch/cell identifier;
identifying a subscriber profile for the subscriber;
comparing the identified set of LCA identifiers to the subscriber profile to determine if at least one of the identified set of LCA identifiers is included in the subscriber profile; and
determining that the call is in a home LCA responsive to determining that at least one of the set of LCA identifiers is included in the subscriber profile.

8. The method of claim 7 wherein:
if the call is in the home LCA, then the method further comprises transmitting a message to a rating engine for the wireless network indicating that the call is a local call; and
if the call is not in the home LCA, then the method further comprises transmitting a message to the rating engine for the wireless network indicating that the call is a long distance call.

9. The method of claim 7 further comprising generating a switch type data structure having a plurality of entries that map a point code for a switching system to a type of the switching system.

10. The method of claim 9 further comprising:
receiving a point code for the switching system serving the subscriber for the call;
searching the switch type data structure based on the point code to identify the type of switching system;
identifying a format of the switch/cell identifier based on the type of the switching system; and
identifying the sector identifier in the switch/cell identifier based on the format of the switch/cell identifier.

11. The method of claim 10 wherein the format of the switch/cell identifier indicates at least one of a start bit or a stop bit for the sector identifier included in the switch/cell identifier.

12. The method of claim 7 wherein the set of LCA identifiers mapped to the switch/cell identifier in the entries of the mapping data structure includes an LCA identifier for each of the LCAs associated with the switch/cell identifier.

13. A local calling area (LCA) determination system in a wireless network for determining whether calls are in a home LCA, the LCA determination system comprising:
a mapping data structure having a plurality of entries that map a switch/cell identifier associated with a switching system and a cell site in the wireless network to a set of LCA identifiers; and
a processing system adapted to receive a switch/cell identifier associated with a switching system, a cell site, and a cell sector serving a first subscriber for a call in the wireless network, to search the mapping data structure based on the received switch/cell identifier to identify a set of LCA identifiers mapped to the received switch/cell identifier, to identify a subscriber profile for a second subscriber on the call, to compare the identified set of LCA identifiers to the subscriber profile to determine if at least one of the identified set of LCA identifiers is included in the subscriber profile, and to determine that the call is in a home LCA responsive to determining that at least one of the set of LCA identifiers is included in the subscriber profile.

14. The LCA determination system of claim 13 wherein:
if the call is in the home LCA, then the processing system is further adapted to transmit a message to a rating engine for the wireless network indicating that the call is a local call; and
if the call is not in the home LCA, then the processing system is further adapted to transmit a message to the rating engine for the wireless network indicating that the call is a long distance call.

15. The LCA determination system of claim 13 wherein a sector identifier is masked in the switch/cell identifier in the entries of the mapping data structure.

16. The LCA determination system of claim 15 wherein the processing system is further adapted to:
identify a type of the switching system serving the first subscriber for the call;
identify a sector identifier in the switch/cell identifier based on the type of the switching system;
mask the sector identifier in the switch/cell identifier to determine a masked switch/cell identifier; and
search the mapping data structure based on the masked switch/cell identifier to identify the set of LCA identifiers mapped to the masked switch/cell identifier.

17. The LCA determination system of claim 16 further comprising a switch type data structure having a plurality of entries that map a point code for a switching system to a type of the switching system.

18. The LCA determination system of claim 17 wherein the processing system is further adapted to:
receive a point code for the switching system serving the first subscriber for the call;
search the switch type data structure based on the point code to identify the type of switching system;
identify a format of the switch/cell identifier based on the type of the switching system; and
identify the sector identifier in the switch/cell identifier based on the format of the switch/cell identifier.

19. The LCA determination system of claim 18 wherein the format of the switch/cell identifier indicates at least one of a start bit or a stop bit for the sector identifier included in the switch/cell identifier.

20. The LCA determination system of claim 13 wherein the LCA determination system is further adapted to:
receive the switch/cell identifier from a service control point (SCP) for a prepaid call; and
receive the switch/cell identifier from a billing system for a postpaid call.

* * * * *

UNITED STATES PATENT AND TRADEMARK OFFICE
CERTIFICATE OF CORRECTION

| | | |
|---|---|---|
| PATENT NO. | : 7,725,104 B2 | |
| APPLICATION NO. | : 11/425196 | |
| DATED | : May 25, 2010 | |
| INVENTOR(S) | : Cai et al. | |

It is certified that error appears in the above-identified patent and that said Letters Patent is hereby corrected as shown below:

In column 2, line 24, the text "tills determination" should read "this determination".

In column 11, line 1, the text "the switching system sewing" should read "the switching system serving".

Signed and Sealed this

Second Day of November, 2010

David J. Kappos
*Director of the United States Patent and Trademark Office*